United States Patent
Taylor et al.

(10) Patent No.: US 10,311,683 B2
(45) Date of Patent: Jun. 4, 2019

(54) APPARATUS AND METHOD FOR MONITORING POINT OF SALE TERMINALS

(71) Applicant: Walmart Apollo, LLC, Bentonville, AR (US)

(72) Inventors: Robert J. Taylor, Rogers, AR (US); Yurgis Mauro Bacallao, Centerton, AR (US); Daniel Cruz, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/655,132

(22) Filed: Jul. 20, 2017

(65) Prior Publication Data

US 2018/0033257 A1 Feb. 1, 2018

Related U.S. Application Data

(60) Provisional application No. 62/366,880, filed on Jul. 26, 2016, provisional application No. 62/366,832, filed on Jul. 26, 2016.

(51) Int. Cl.
*G07G 1/01* (2006.01)
*G08B 5/36* (2006.01)

(52) U.S. Cl.
CPC ...... *G07G 1/01* (2013.01); *G08B 5/36* (2013.01)

(58) Field of Classification Search
CPC ....... G06Q 20/18; G06Q 30/0601; G08B 5/36
See application file for complete search history.

(56) References Cited

U.S. PATENT DOCUMENTS

| 5,877,485 A | 3/1999 | Swartz |
| 6,281,796 B1 | 8/2001 | Canipe |

(Continued)

FOREIGN PATENT DOCUMENTS

| CN | 202422302 U | 9/2012 |
| CN | 105243997 | 1/2016 |

(Continued)

OTHER PUBLICATIONS

"Patterns in Nature: Light and Optics," https://www.asu.edu/courses/phs208/patternsbb/PiN/rdg/color/color.shtml.*

(Continued)

*Primary Examiner* — Laura N Nguyen
(74) *Attorney, Agent, or Firm* — Fitch, Even, Tabin & Flannery, LLP (57) ABSTRACT

In some embodiments, apparatuses and methods are provided herein useful to monitor point of sale terminals and provide information to customers, via a lighting system. In some embodiments, information is provided, via visible light, to consumers and, via invisible light, to the management of a retail shopping facility. For example, a notification system for monitoring point of sale terminals in a retail shopping facility may include one or more visible light emitting status lights, at least one non-visible light emitting status light at each of the point of sale terminals, one or more optical sensors configured to detect the non-visible wavelength and an intensity associated with the non-visible wavelength emitted from the at least one non-visible light emitting status light; and a control circuit.

25 Claims, 7 Drawing Sheets

(56) References Cited

U.S. PATENT DOCUMENTS

| | | | |
|---|---|---|---|
| 6,314,407 B1 | 11/2001 | Maeno | |
| 6,354,498 B1* | 3/2002 | Lutz | G07G 1/0054 |
| | | | 186/52 |
| 6,530,520 B1* | 3/2003 | Snyder | A47F 9/047 |
| | | | 235/383 |
| 6,571,218 B1* | 5/2003 | Sadler | G06Q 20/20 |
| | | | 235/462.01 |
| 6,622,011 B1* | 9/2003 | Joeressen | H04B 1/7156 |
| | | | 455/88 |
| 7,255,200 B1 | 8/2007 | Walter | |
| 7,866,546 B1 | 1/2011 | Vance | |
| 7,870,028 B2 | 1/2011 | Kloubakov | |
| 7,933,625 B2 | 4/2011 | Sugikawa | |
| 8,365,993 B2 | 2/2013 | Teraoka | |
| 8,723,689 B2 | 5/2014 | Mimeault | |
| 2003/0078849 A1 | 4/2003 | Snyder | |
| 2004/0041021 A1 | 3/2004 | Nugent | |
| 2005/0264428 A1 | 12/2005 | Pederson | |
| 2006/0131402 A1 | 6/2006 | Crockett | |
| 2010/0202622 A1* | 8/2010 | Hardee | H04M 19/044 |
| | | | 381/57 |
| 2012/0320199 A1 | 12/2012 | Kundu | |
| 2012/0323621 A1 | 12/2012 | Carlegren | |
| 2013/0278425 A1 | 10/2013 | Cunningham | |
| 2014/0236653 A1 | 8/2014 | Farrell | |
| 2015/0112786 A1* | 4/2015 | Rissanen | G06Q 30/0222 |
| | | | 705/14.23 |
| 2015/0236653 A1 | 8/2015 | Gansinger | |
| 2017/0178140 A1* | 6/2017 | Kawamoto | G06Q 20/4016 |
| 2017/0185984 A1* | 6/2017 | Leggo | G06Q 20/202 |
| 2017/0186285 A1* | 6/2017 | Kakino | G07G 1/0072 |
| 2017/0238401 A1* | 8/2017 | Sadwick | A61N 5/01 |
| | | | 315/294 |

FOREIGN PATENT DOCUMENTS

| | | |
|---|---|---|
| JP | 2010188601 A | 9/2010 |
| JP | 2012064107 A | 3/2012 |

OTHER PUBLICATIONS

"The Dark Side of Visible and Invisible Light," Essilor News, https://www.essilorusa.com/newsroom/the-dark-side-of-visible-and-invisible-light.*

"What Is Non-Visible Light?" UniverseOptics, http://www.universeoptics.com/what-is-non-visible-light/.*

"The Visible and Non-visible Light Spectrum," Arizona State University, https://askabiologist.asu.edu/spectrum-light.*

"Adaptive Frequency Hopping for Reduced Interference between Bluetooth® and Wireless LAN," Charles Hodgdon, Design & Reuse, 2003, https://www.design-reuse.com/articles/5715/adaptive-frequency-hopping-for-reduced-interference-between-bluetooth-and-wireless-lan.html.*

NCR; "I am the NCR FastLane SelfServ Checkout"; Release 6; NCR Corporation; 2015; pp. 1-6.

PCT; App. No. PCT/US17/43453; International Search Report and Written Opinion dated Nov. 28, 2017.

* cited by examiner

APPARATUS AND METHOD FOR MONITORING POINT OF SALE TERMINALS

CROSS-REFERENCE TO RELATED APPLICATION

This application claims the benefit of U.S. Provisional Applications Nos. 62/366,880, filed Jul. 26, 2016, and 62/366,832, filed Jul. 26, 2016, which are incorporated herein by reference in their entirety.

TECHNICAL FIELD

This invention relates generally to point of sale systems in a retail shopping facility.

BACKGROUND

In busy retail shopping facilities there are sometimes numerous point of sale terminals available for customer use and/or for management to maintain. Traditionally, sales clerks or associates operated point of sale terminals and requested assistance helping customers or addressing problems manually, such as by calling a supervisor over to their terminal to aid with the processing of a customer request or other concerns. Providing a more efficient manner of identifying and addressing issues arising at the point of sale terminals or the check-out area would improve the customer check-out experience.

BRIEF DESCRIPTION OF THE DRAWINGS

Disclosed herein are embodiments of systems, apparatuses and methods pertaining to monitoring point of sale terminals in a retail shopping facility. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to monitor point of sale terminals and provide information to customers, via a notification and lighting system. While currently available light fixtures at point of sale terminals may be large and limited in their functionality, the embodiments disclosed herein provide information, via visible light, to consumers and provide communications, via invisible light or tunable visible light, to the management of a retail shopping facility. Further, with the systems, apparatuses, and methods described herein, the light fixtures may take up less space (which can be particularly useful when employing one of the line of sight communication methods described herein) while still providing more information, consuming less power, operating more efficiently, facilitating increased responsiveness to issues arising at point of sale terminals, and/or discretely alerting management or other associates of status and issues such that customers may not easily detect the communications being sent from the point of sale terminal to the store management. These benefits may be further facilitated by the use of tunable lights and/or light-emitting diodes (LEDs).

In one illustrative embodiment, a notification system for monitoring point of sale terminals in a retail shopping facility includes one or more visible light emitting status lights and at least one non-visible light emitting status light at each point of sale terminals, one or more optical sensors configured to detect the non-visible wavelength and an intensity associated with the non-visible wavelength emitted from the at least one non-visible light emitting status light, and a control circuit in communication with the optical sensors.

By one approach, the visible light emitting status lights associated with a point of sale terminal are configured to emit different wavelengths visible to customers to indicate a visible status of the associated point of sale terminal to the customers. For example, the visible light emitting status lights may include four different lights emitting different visible wavelengths such as, for example, blue, green, yellow, red, and light wavelengths.

By emitting four different light colors, the point of sale terminal may communicate (by providing visual notification) four different aspects of the point of sale terminal to customers within the retail shopping facility. For example, a green light may indicate that the terminal is available and/or operating correctly, an amber or yellow light may indicate that the terminal is in use and/or is awaiting assistance from a store associate or management, red may indicate that a terminal is closed or not working properly, and a white light may indicate that a lane is available for use and/or provide overhead lighting. As used herein, one or more of the lights may be illuminated at any given time.

In one illustrative configuration, the non-visible light emitting status light at each of the point of sale terminals is configured to emit a wavelength that is not generally visible to the customers within the retail shopping facility and indicates a management status to store management. By one approach, the non-visible light emitting status light may be configured to emit a specific wavelength, a plurality of different wavelengths, or a combination of wavelengths and an intensity associated with each wavelength. By another approach, the non-visible light emitting status light is configured to modulate emitted non-visible light by changing one or more of an intensity, phase, and wavelength over time.

In one embodiment, the non-visible light emitting status light includes multiple non-visible light emitting status lights emitting different wavelengths or a tunable non-visible light emitting status light. This permits the non-visible light emitting status light to emit a variety of different lights and thereby signals to the store management.

In addition, in one embodiment, the visible light emitting status lights include a tunable visible light emitting status light configured to emit different wavelengths. The difference between some of these wavelengths may be imperceptible or indiscernible to the human eye, though the optical sensors are configured to detect such distinctions. In this manner, the optical sensors can detect the specific wavelengths from the tunable visible light emitting status light and communication this information to the control circuit, which may provide notification of the detection of the particular wavelength(s) detected. In this manner, similar to the non-visible light emitting status lights, the tunable visible light emitting status lights can communicate information about the associated point of sale terminal to the store management by emitting distinct wavelengths that are indiscernible to the human eye.

Further, the embodiments described herein also may include one or more optical sensors configured to detect the non-visible wavelength and an intensity associated with the non-visible wavelength emitted from the at least one non-visible light emitting status light. For example, the optical sensors may recognize that the non-visible light emitting status light emitted a specific combination of wavelengths that indicates that a particular point of sale terminal associated with that light emitting status light is low on cash. The optical sensors also may be configured to detect the distinctions in the tunable visible light emitting status light that are imperceptible or indistinguishable to the human eye. For example, the optical sensor may determine that the tunable visible light emitting status light associated with a particular point of sale terminal, which regularly emits 590 nm, is now emitting light at a wavelength of 591 nm, and this change in the emitted light may indicated that the receipt paper at the terminal is running low.

By one approach, the one or more optical sensors comprise a centralized light sensor configured to scan the point of sale terminals and identify the non-visible wavelengths (or tunable visible wavelengths) emitted from light emitting status lights and identify the terminal associated with the emitting light. In another approach, the one or more optical sensors comprise multiple, decentralized light sensors configured to monitor at least one of the point of sale terminals and identify the wavelengths emitted from the light emitting status light. To that end, the multiple, decentralized light sensors may be configured to identify the non-visible wavelengths (or tunable visible wavelengths) emitted and the point of sale terminal associate therewith.

In one illustrative approach, the one or more optical sensors may include at least one light receiver or light transceiver configured to detect invisible light emitted by the at least one non-visible light emitting status light or to detect the differences or distinctions in the visible light emitted by a tunable visible light emitting status light.

In one embodiment, the one or more optical sensors may include an infrared transceiver that may receive an indication from a managing device.

In one exemplary approach, the notification system includes a control circuit in communication with the one or more optical sensors. The control circuit, by one approach, is configured to provide a notification regarding the detection of the non-visible wavelength from the at least one non-visible light emitting status light and the point of sale terminal associated therewith.

As used herein, the lights emitting status lights may include light emitting diodes (LEDs). By incorporating an LED, the status lights may take up less space (reduce bulkiness of previous lighting), consume less power, reduce the light fixture footprint, improve efficiency, and increase responsiveness of the system.

Further, the light emitting status lights may emit a specific wavelength, a combination of wavelengths, or modulated light to communicate to the optical sensor(s) or receiver(s). Though a variety of light wavelengths or combinations thereof may be used, the light emitting status lights typically do not emit visible flashing or strobe lights.

Similar to some of the previous discussed embodiments, in another configuration, the lighting and notification system may include a tunable, visible light emitting status light at each point of sale terminal, where the visible light emitting status light is configured to emit different visible wavelengths that are visible to the customer but visually indistinguishable to the customer within the retail shopping facility. Further, such a system may include optical sensors configured to detect specific wavelengths emitted by the tunable, visible light emitting status light, a light database with at least one of a specific wavelength or a combination of wavelengths corresponding to different point of sale terminals or notifications provided by a particular point of sale terminal. In addition, the system includes a control circuit in communication with the optical sensors and light database, with the control circuit configured to analyze the detected specific wavelength of combination of wavelengths and access the light database to determine the point of sale terminal and notification provided by the emission of the specific wavelengths or combination thereof.

In this manner, the tunable, visible light emitting status light may be configured to emit multiple different visible wavelengths or a combination of wavelengths that appear similar to a human eye but are distinguishable to the optical sensors.

In one illustrative approach, the system also may include an associate device in communication with the control circuit and configured to receive an indication of attention needed at one of the point of sale terminals. In another approach, the system may include a handheld associate devices configured to have one of the one or more optical sensors incorporated therein such that the non-visible light is detected and provides notification to an associate via a mobile application.

A variety of formats or fixture configurations may be employed with the lights and notification systems descried herein. Indeed, the one or more visible light emitting status lights and the at least one non-visible light emitting status light may be configured in a single light fixture or separate light fixtures. In one illustrative configuration, the at least one non-visible light emitting status light and the one or more visible light emitting status lights are disposed in a low-profile fixture configured to avoid interfering with a line of sight between the at least one non-visible light emitting status light and the one or more optical sensors. For example, the status lights may not be contained within a bulky box or shade.

By way of another example, the one or more visible light emitting status lights may include visible light emitting diodes or a tunable visible light emitting diode and the at least one non-visible light emitting status light comprises a non-visible light emitting diode or a tunable non-visible light emitting diode.

To facilitate the terminal monitoring described herein, the system may include a light database of non-visible wavelengths, visible wavelengths and/or tunable wavelength distinctions and notifications associated therewith and wherein the control circuit accesses the light database in providing the notification regarding the detection of the wavelengths from the non-visible light emitting status light or visible light emitting status light.

As described herein, a method of monitoring point of sale terminals may include providing a light emitting status light (and possibly a non-visible light emitting status light) at a point of sale terminal, monitoring the point of sale terminals via optical sensors configured to detect the wavelengths emitted by the status lights, emitting the light from the light emitting status light associated with one of the point of sale terminals, detecting the emission of the light associated with the one of the point of sale terminals, and providing notification to a management device, via a control circuit in communication with the one or more optical sensors, regarding the detection of the light emitted from the light emitting status light and the point of sale terminal associated therewith.

In one embodiment, the provision of the point of sale terminals includes one or more light emitting status lights emitting indicates a visible status of the associated point of sale terminal and at least one non-visible light emitting status light emitting non-visible light, which emits light that is not visible to the customers within the retail shopping facility but which indicates a management status to store management. In one configuration, the method further includes modulating the non-visible light emitting status light. For example, the systems or methods described herein may include modulating the phase or modulating the power such as, for example, by modulating one or more of the light emitting status lights at a specific rate (Hertz). In one approach, by modulating the light in an "on" and "off" manner the light emitting status lights (and the signals emitting therefrom) may function like Morse code via machine vision to give custom/or unscripted alerts.

In another embodiment, the light emitting status light provided at the point of sale terminal is a tunable, visible light such that, in operation, the tunable, visible light emitting status light is configured to emit visible wavelengths of light that are visually indistinguishable to customers but that are discernable by one or more optical sensors in communication with the control critic.

By one approach, the method may further include accessing a wavelength database, via the control circuit, to determine which of the point of sale terminals is associated with the emitted wavelengths. The information that may be transmitted between the point of sale terminal and the control circuit or central computer may include terminal conditions (e.g., on/off condition, locked/unlocked conditions, previous operator), cash volume or drawer conditions, payment information, associate information, terminal transit volume, register transactions (e.g., cash transactions, credit transactions, tender, gift cards, or coupons), and end-of-day cash count, among others. Further, the information transmitted may help particularly helpful for self-check-out terminals because they can help the system determine, for example, which customers have paid and whether the receipt total matches items within the basket/bag.

Figure 1:
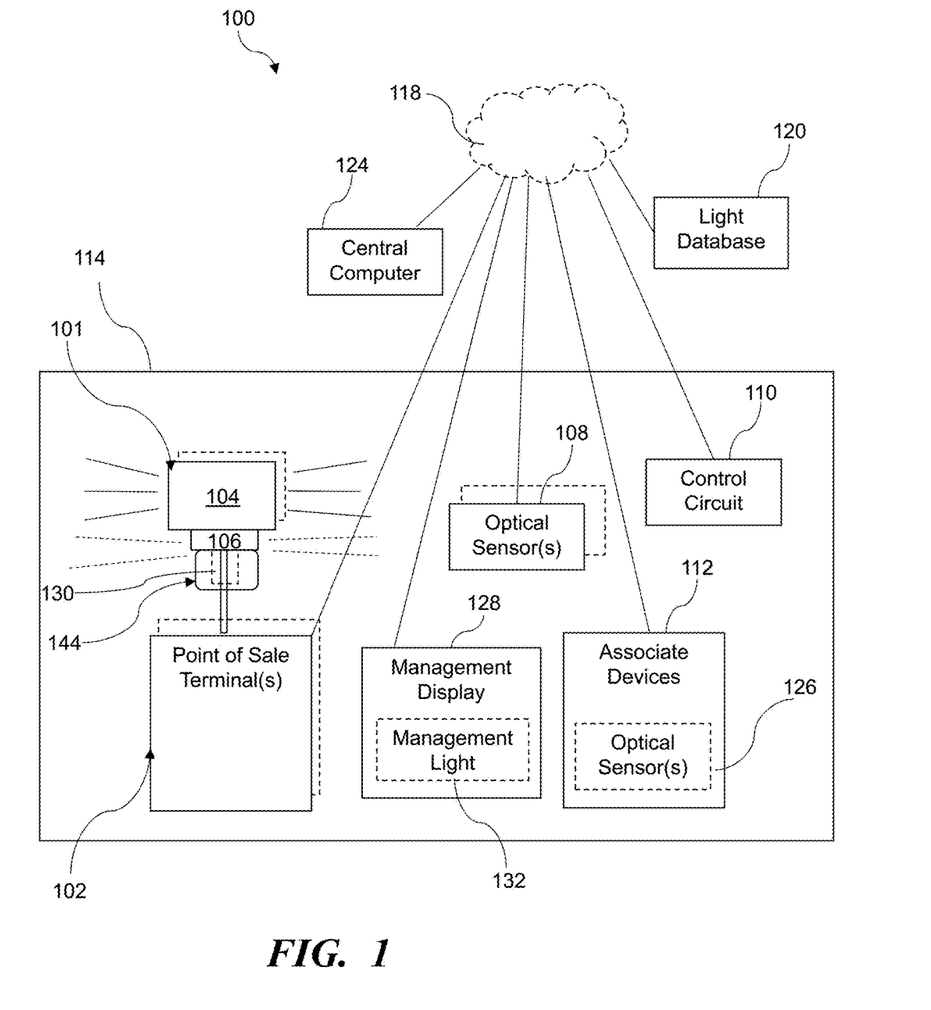
FIG. 1 is a block diagram of a system in accordance with some embodiments.

One illustrative notification system 100, shown in FIG. 1, includes one or more point of sale terminals 102 in a retail shopping facility 114. These point of sale terminals 102 may include, for example, self-checkout terminals or terminals operated by store associates. The system 100 further includes a light fixture 101 with a visible light emitting status light 104 associated with each of the point of sale terminals 102. The visible light emitting status light 104 may include multiple non-visible light emitting status lights emitting different wavelengths. As used herein, the visible light emitting status lights 104 are configured to emit different wavelengths visible to customers to indicate a visible status of the associated point of sale terminal to the customers.

The notification system 100, as illustrated in FIG. 1, also includes at least one non-visible light emitting status light 106 at each of the point of sale terminals. The non-visible light emitting status light 106 is configured to emit wavelengths that are not generally visible to the customers within the retail shopping facility, but which can indicate a management status to the store management. For example, the non-visible light emitting status light 106 may indicate that a manager or another store associate is needed at a particular point of sale terminal 102 to approve the purchase of a certain item.

In one embodiment, the non-visible light emitting status light 106 includes multiple non-visible light emitting status lights emitting different wavelengths. In another embodiment, the non-visible light emitting status light includes a tunable non-visible light emitting status.

Depending on the configuration, the non-visible light emitting status light 106 is configured to emit a specific wavelength, a plurality of different wavelengths, and/or a combination of wavelengths and an intensity associated with each wavelength. The non-visible light emitting status light 106 also may emitted modulated wavelengths. For example, the non-visible light emitting status light 106 may be configured to modulate emitted non-visible light by changing one or more of an intensity, phase, and wavelength over time. As is well known, this modulation of the light is used to convey data on the carrier light wave, the data providing any of the various messages, status and/or data information that is to be communicated using the status light 106 (or any other visible and non-visible status lights or indicators described herein and the like).

The particular non-visible light emitted from the non-visible light emitting status light 106 may indicate which of the point of sale terminals 102 is associated with the non-visible light emitting status light 106. To that end, the system 100 may reference a light database 120 as outlined below.

As shown, the notification system 100 also includes one or more optical sensors 108 configured to detect the non-visible wavelength and an intensity associated with the non-visible wavelength emitted from the at least one non-visible light emitting status light 106. By one approach, the optical sensor 108 may be a centralized device that detects invisible or non-visible light emitted from the non-visible light emitting status lights 106 from multiple the point of sale terminals. For example, the optical sensor 108 may scan one or more, such as a bank, of point of sale terminals and identify the non-visible wavelengths emitted from the non-visible light emitting status light 106 and identify the terminal associated with the non-visible light emitting status light 106. In another approach, the optical sensor 108 may be a decentralized device that tracks the emission of non-visible light emitted from the non-visible light emitting status lights at a particular point of sale terminal.

The optical sensor(s) 108 may detect the associated point of sale terminal by noting the location of the light detected or may reference a database to determine that the wavelengths emitted are associated with a particular point of sale terminal.

In some embodiments, the optical sensors 108 include one or more of a light sensor, a photon sensor, and a spectrometer. Further, as discussed above, the notification system 100 may be configured to compare the emitted light from the light fixture with the light database 120 that specifies the wavelength, wavelength combinations, and intensities associated therewith to determine the information being transmitted by the light fixture.

As used herein, the terms "non-visible" and "visible" refer to light that is visible or invisible to humans. Thus, while certain light may be visible to the optical sensors 108, it is not visible as used herein unless it is visible to the customers. Further, the optical sensor(s) 108 also may be able to detect variations in the visible light that are imperceptible or indistinguishable to the human as, as suggested above.

By one approach, the optical sensor(s) 108 include a centralized invisible light sensor configured to scan the point of sale terminals 102 and identify the non-visible wavelengths emitted from the non-visible light emitting status light 106 and identify the terminal 102 associated with the non-visible light emitting status light.

By another approach, the optical sensor(s) 108 include multiple, decentralized non-visible light sensors configured to monitor at least one of the point of sale terminals and identify the non-visible wavelengths emitted from the non-visible light emitting status light. In operation, the multiple, decentralized non-visible light sensors, such as optical sensor(s) 108, may identify the non-visible wavelengths emitted and the point of sale terminal associated therewith.

In one illustrative approach, the optical sensor(s) 108 include at least one light receiver or light transceiver configured to detect invisible light emitted by the at least one non-visible light emitting status light. In another approach, the optical sensor 108 includes an infrared transceiver that may receive an indication from a managing device.

The notification system 100 also includes a control circuit 110 that is in communication with the optical sensor(s) 108. The control circuit 110 is configured to provide a notification regarding the detection of the non-visible wavelength from the at least one non-visible light emitting status light and the point of sale terminal associated therewith.

Thus, by one approach, the notification system 100 includes a point of sale terminal 102 with a visible light emitting status light 104 and a non-visible light emitting status light 106, one or more optical sensors 108 configured to detect the non-visible light, and a control circuit 110 in communication with the one or more optical sensors 108.

As illustrated in FIG. 1, the notification system 100 also may include an associate device 112 in communication with the control circuit 110. By one approach, the associate device 112 is in communication with the control circuit 110 and configured to receive an indication of attention needed at one of the point of sale terminals 112. In this manner, if an optical sensor 108 detects the emission of a particular invisible light from the non-visible light emitting status light 106 that indicates a need at a particular point of sale terminal 102, the control circuit 110 (in communication with the optical sensor 108) will send a notification to the associate device 112.

In one illustrative approach, the associate device(s) 112 may have an optical sensor 126 disposed therein or associated therewith. By one approach, a handheld associate device is configured to have an optical sensor 126 incorporated therein such that the non-visible light is detected and provides notification to an associate via a mobile application. The associate device 112 also may have a control circuit, similar to control circuit 110, incorporated therein.

In another embodiment, the system 100 includes a management display 128 that may indicate whether one of the point of sale terminals has provided a notification. In addition, if the non-visible light emitting status light 106 regularly sends terminal condition information, the management display 128 (or the associate device 112) may have information pertaining to the operation of the terminals thereon. For example, if the point of sale terminals 102, via the non-visible light emitting status lights 106, report registration transaction information and terminal transit volume to the control circuit 110, this information may be presented to the store management via the management display 128. This management display 128 may be disposed within the retail facility 114 or may be remote from the facility. Further, the management display 128 may display reports with information regarding numerous notifications and/or issues concerning multiple point of sale terminals over a given period of time.

As illustrated in FIG. 1, the point of sale terminal(s) 102, the optical sensor(s) 108, the control circuit 110, the associate device(s) 112, the light database 120, the management display 128, and the central computer 124, if present, may be communicatively coupled, either directly or indirectly, such as over one or more distributed communication networks 118, which may include, for example, LAN, WAN, Internet, cellular, Wi-Fi, and other such communication networks or combinations of two or more of such networks.

The notification system 100 also may include a light database 120 of non-visible wavelengths and/or tunable visible wavelengths and notifications associated therewith. By one approach, the control circuit 110 is configured to access the light database 120 such that the control circuit 110 can provide a notification regarding the detection of wavelengths from the at least one non-visible light emitting status light 106 (and possible visible wavelengths from a tunable visible light emitting status light 104).

As mentioned above, a variety of formats or fixtures may be used with the lights and notification system described herein. Indeed, the visible light emitting status lights 104 and the non-visible light emitting status light 106 may be configured in a single light fixture or separate light fixtures. In one illustrative configuration, the non-visible light emitting status light 106 and the visible light emitting status lights 104 are disposed in a low-profile light fixture configured to avoid interfering with a line of sight between the non-visible light emitting status light 106 and the one or more optical sensors 108. By way of another example, the visible light emitting status lights 104 may include visible light emitting diodes or a tunable visible light emitting diode and the non-visible light emitting status light 106 may include a non-visible light emitting diode or a tunable non-visible light emitting diode.

In one configuration, the visible light emitting status lights 104 include at least four different light emitting status lights that emit different visible wavelengths including, for example, green, yellow or amber, red, and white, among others. The four different visible wavelengths emitted provide visual notifications to customers when the different visible wavelengths are emitted.

To facilitate the terminal monitoring described herein, the system may include a light database of wavelengths (visible and non-visible, if appropriate), combinations of wavelengths, and intensities and notifications associated therewith. The control circuit 110 typically accesses the light database 120 in providing notifications or information regarding the detection of the wavelengths from the light emitting status lights.

The status lights communicate information from the point of sale terminals 102 to control circuit 110 or central computer 124 via the optical sensor 108 by emitting particular wavelengths or changes in wavelengths, which are not detectable by the consumers. These communications or notifications are unintelligible to those within the store except for the devices in communication with the light database 120. In this manner, the communications are not readable to those outside of store management or store employees.

In another aspect, the notification systems described herein permit the point of sale terminals to transmit register-specific information with different access levels. For example, a customer viewer application downloaded to a customer's phone may have a selection for "view open registers" or "rank cashiers by speed" or similar view. Alternatively, a management system or device would have access to specific cashier performance time, time until employee break or lunch, or alert/notification view, among others. The access levels could be controlled via the application itself. In another configuration, the information transmitted from the point of sale terminals 102 helps provide information to customers in other manners, such as by having a blue light emitted from the light emitting status light 104 indicating a high performing cashier or sales associate to indicate that the checkout line is fast moving.

By one approach, the light emitting status light 104 is a tunable visible light emitting status light configured to emit a variety of wavelengths including some different wavelengths that are visually indiscernible from one another (to a human eye). Further, the optical sensors 108 may be configured to detect such differences in wavelengths emitted from the tunable visible light emitting status light 104.

In one illustrative configuration, the light fixture 101 includes a base member 144 that may include electronic elements and a coupling section. By one approach, the light fixture 101 or point of sale terminals 102 may have an optical sensor 130 incorporated into therein. In one configuration, the optical sensor 130 may be incorporated into the base member 144 of the light fixture 101. Such an optical sensor 130 may be configured to sense or detect light emitted from a management light 132, which may be employed to send communications, such as by emitting non-visible light, from the control circuit 110 or central computer 124. In this manner, the notification system 100 may provide two-way communication between the point of sale terminals 102 and the management display 128, control circuit 110, or other devices connected through the network 118. This two-way communication, in turn, provides faster completion of approvals, such as manager approvals, or system or terminal overrides because these communications can occur wirelessly.

A portion of the light fixture discussed above is illustrated in FIG. 2. More particularly, the low profile light fixture 200 includes a visible light emitting status light 204, an invisible light emitting status light 206, and a base member 244 that may include electronic elements and a coupling section. In one configuration, the base member 244 may include an optical sensor 230, similar to that discussed above.

Figure 2:
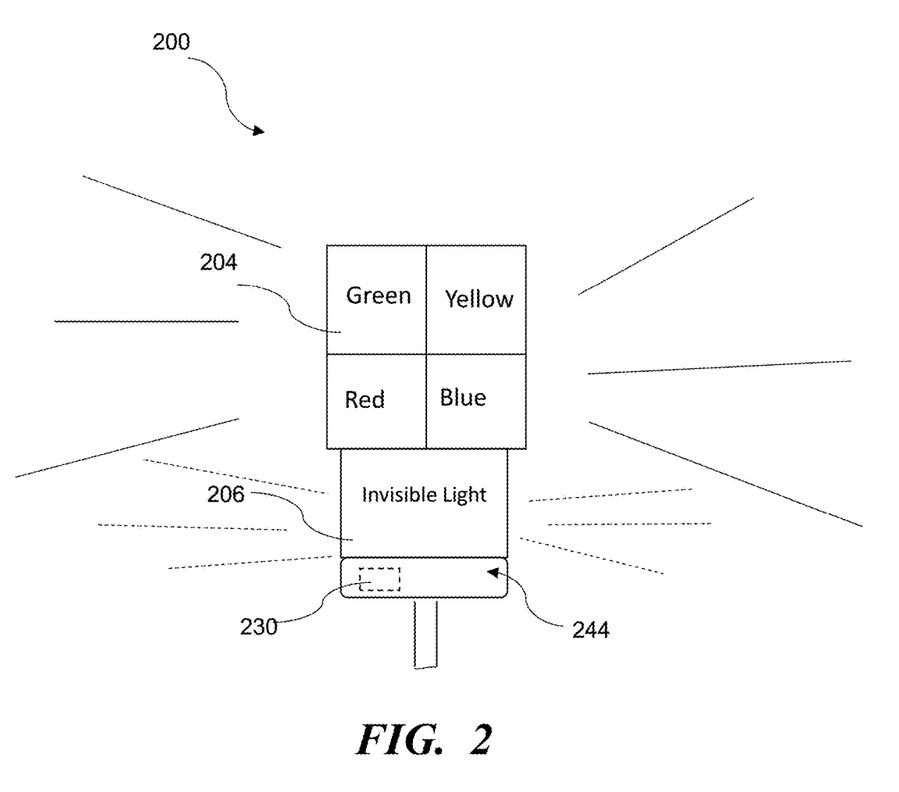
FIG. 2 is a block diagram of one embodiment of a portion of the system of FIG. 1.

In one embodiment, the invisible light emitting status light 206 may emit a number of different wavelengths, such as infrared wavelengths. By one approach, the light emitting status light 204 may emit, for example, green, yellow, red, and white wavelengths. Lights with other wavelengths are contemplated, such as orange and blue, among others.

Figure 4:
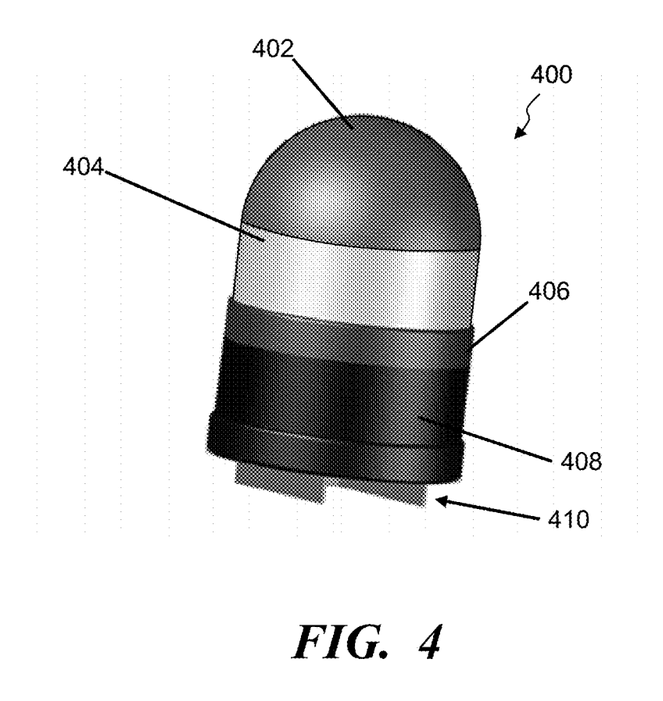
FIG. 4 is a schematic diagram of a light fixture in accordance with some embodiments.

Turning briefly to FIG. 4, another illustrative low profile light fixture 400 is shown. The light fixture 400 includes a coupling section 410, a base containing the electronic elements 408, an invisible light 406, such as an infrared LED light, a white light 404, such as a white LED light, and a top dome shaped multicolor light section 402, which may illuminate a number of different colors, such as green, blue, rend, and amber, among others. This domed shaped multicolor light section 402 may include a light emitting a single wavelength or may emit multiple wavelengths.

Figure 3:
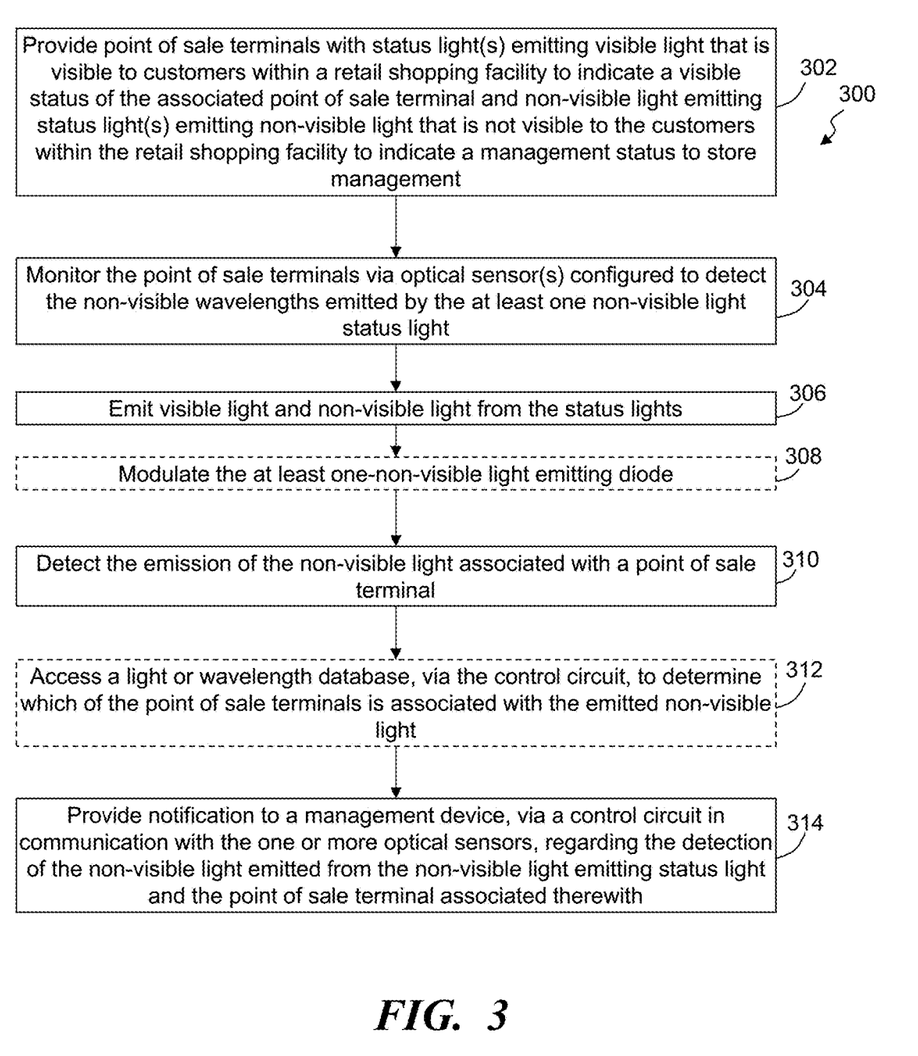
FIG. 3 is a flow diagram of a method for monitoring point of sale terminals in accordance with some embodiments.

In operation, the lighting and notification system 100 discussed herein may provide a variety of information to the store management. FIG. 3 illustrates one illustrative manner of monitoring point of sale terminals.

In one illustrative example, the method 300 of monitoring point of sale terminals includes providing 302 point of sale terminals with a visible light emitting status light that is visible to customers within a retail shopping facility to indicate a visible status of the associated point of sale terminal and a non-visible light emitting status light emitting light that is not visible to the customers within the retail shopping facility. Thought not visible to customer, the non-visible light is visible or detectable by optical sensors in communication with a control circuit to thereby indicate a management status to the store management. Further, the method 300 may include monitoring 304 the point of sale terminals via one or more optical sensors configured to detect the non-visible wavelengths emitted by the non-visible status light(s).

The method 300 also includes emitting 306 non-visible light from the non-visible light emitting status light associated with one of the point of sale terminals and emitting visible light from the visible light emitting status light. In addition, the method 300 also detects 310 the emission of the non-visible light associated with a point of sale terminal. In one illustrative approach, the method 300 includes accessing 312 a light or wavelength database to determine which of the point of sale terminals is associated with the emitted non-visible light or the information being transmitted from the point of sale terminal. The light database may indicate particular wavelengths, combinations of wavelengths, intensities thereof, and other light details associated with a particular point of sale terminal. Further, the light database may indicate what is being communicated by the emission of particular non-visible light. Based on the information in the light database and the emitted light, the method 300 also may provide 314 notification to a management device regarding the detection of the non-visible light emitted from the non-visible light emitting status light and the point of sale terminal associated therewith.

As used herein the non-visible light emitting status light may be configured to emit a specific wavelength, a plurality of different wavelengths, or a combination of wavelengths and an intensity associated with each wavelength. In some approaches, the visible light emitting status light(s) and/or the non-visible light emitting status light(s) include light emitting diodes. By one approach, the non-visible light emitting status light may include a light emitting diode that may modulate 308 the light emitted.

Figure 7:
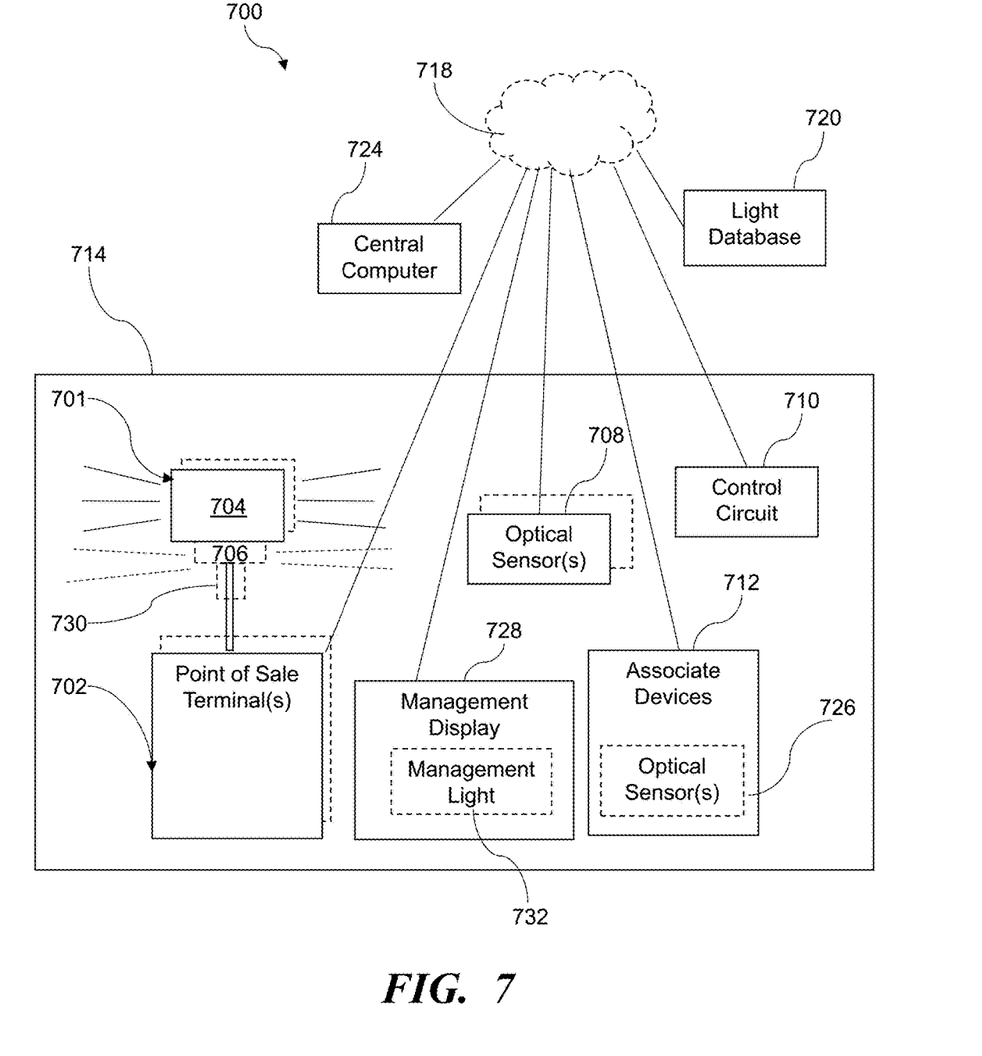
FIG. 7 is a block diagram of another system in accordance with some embodiments.

FIG. 7, which is similar to FIG. 1, includes a lighting and notification system 700 with one or more point of sale terminals 702 having light fixtures 701 associated therewith, optical sensors 708, and a control circuit 710. FIG. 7, however, does not necessarily include an invisible light emitting status light, though such an invisible status light 706 may be included if desired. In the embodiment of FIG. 7 the light fixture 701 associated with a point of sale terminal 702 includes a visible light emitting status light 704 that is tunable. More specifically, the visible light emitting status light 704 is tunable and configured to emit different visible wavelengths that are visible to customers but which are visually indistinguishable to the customers. The discrete tunability of the light emitted from the visible light emitting status light 704 permits a number of different functions to be provided by a single light. Further, at least some of the different wavelengths emitted by the light emitting status light 704 are not perceptibly different to customers, but instead, is detectable by an optical sensor such as through machine vision.

In addition, the optical sensors 708 are configured to detect the different tunable wavelengths. For example, the light emitting status light 704 may generally emit a wavelength that is even such as 590 nm or 592 nm, but if the light emitting status light 704 begins to emit a wavelength that is 591 nm or 593 nm, the light emitting status light 704 may be communicating information to the optical sensor 708, which then communicates this information to the control circuit 710, which can then associate the information with the light database 720 to determine the meaning of the communication, such as, for example, that the sales clerk or associate at the point of sale terminal has requested manager assistance. Such a request for assistance, communicated via the tunable, visible light emitting status light 704, may then be commutated to an associate device 712, which also may have an optical sensor 726 incorporated therein, similar to that discussed above.

Furthermore, terminal information from a number of different retail facilities 714 may be aggregated, such as via a central computer 724. Accordingly, the control circuit 710 at a particular retail facility 714 may communicate various information gathered to the central computer 724. As illustrated in FIG. 7, 1, the point of sale terminal(s) 702, the management display 728, the optical sensor(s) 708, the control circuit 110, the associate device(s) 712, the light database 720, and the central computer 724, if present, may be communicatively coupled, either directly or indirectly, such as over one or more distributed communication networks 718, which may include, for example, LAN, WAN, Internet, cellular, Wi-Fi, and other such communication networks or combinations of two or more of such networks.

In other configurations, the point of sale terminals 702 may have an optical sensor 730 incorporated therein. Such an optical sensor 730 may be configured to sense or detect communications from the control circuit 710 or central computer 724 such as through a management light 732 that may be configured to emit invisible light. In this manner, the notification system 700 may provide two-way communication between the point of sale terminals 702 and the management display or other devices connected through the network 718. This two-way communication, in turn, provides faster completion of approvals, such as manager approvals, or system or terminal overrides because these communications can occur wirelessly.

In another embodiment, the system 700 includes a management display 728 that may indicate whether one of the point of sale terminals has provided a notification. This management display 728 may be disposed within the retail facility 714 or may be remote from the facility. Further, the management display 728 may displays reports with information regarding numerous notifications and/or issues concerning multiple point of sale terminals over a given period of time.

Figure 5:
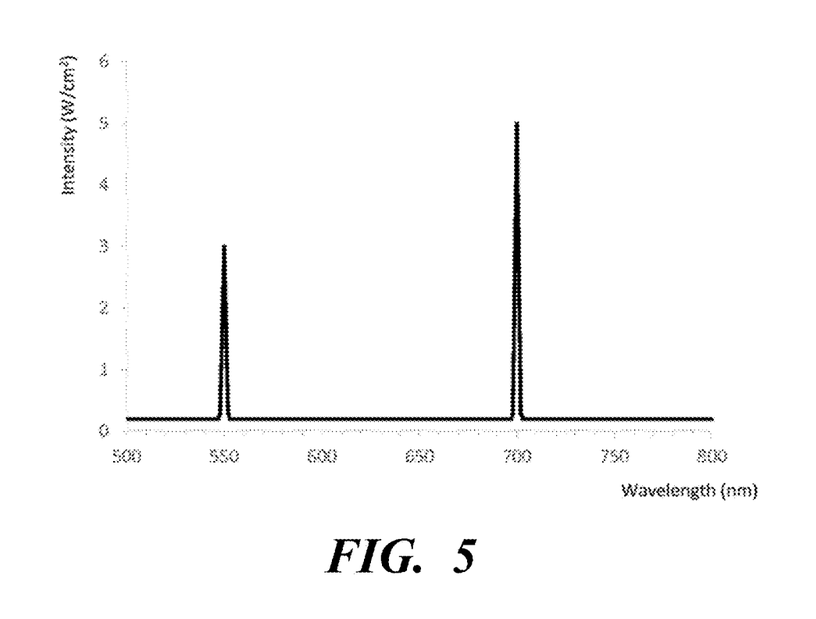
FIG. 5 is an illustration of a detected light in accordance with some embodiments.

Referring now to FIG. 5, an illustration of a spectrum of emitted and/or detected light is shown. The graph in FIG. 5 may represent a spectrometer reading from one or more light sources having a 500 nm peak at 3 W/cm$^2$ intensity and a 700 nm peak at 5 W/cm$^2$ intensity. For some embodiments, the wavelength distribution for each peak may be more spread out. In some embodiments, if a light database 120 indicates that the combination of 3 W/cm$^2$ at 500 nm and 5 W/cm$^2$ at 700 nm indicates that a particular point of sale terminal requires additional cash and the optical sensors 108 obtain a reading similar to that in FIG. 5, the control circuit 110 may determine that the particular point of sale terminal indeed requires more cash and may send a notification accordingly. The detected light emitted in FIG. 5 also may match an entry in the light database 120 that specified peaks at 550 nm and 700 nm, with the 550 nm peak having a relative intensity of approximately 60% of the intensity of the 700 nm peak. Such optical designations or codes captured in the light database 120 may specify any number of wavelength and intensity combinations. The intensity values in the light database 120 may represent an absolute value or a relative value. In some embodiments, one wavelength peak may be a reference peak and the intensities, values, and other wavelength peaks may be defined relative to the intensity of the referenced peak. While FIG. 5 includes the visible wavelength spectrum, in some embodiments (such as the embodiment of FIG. 1), wavelengths in the invisible spectrum (e.g., infrared, ultraviolet) may be used.

Figure 8:
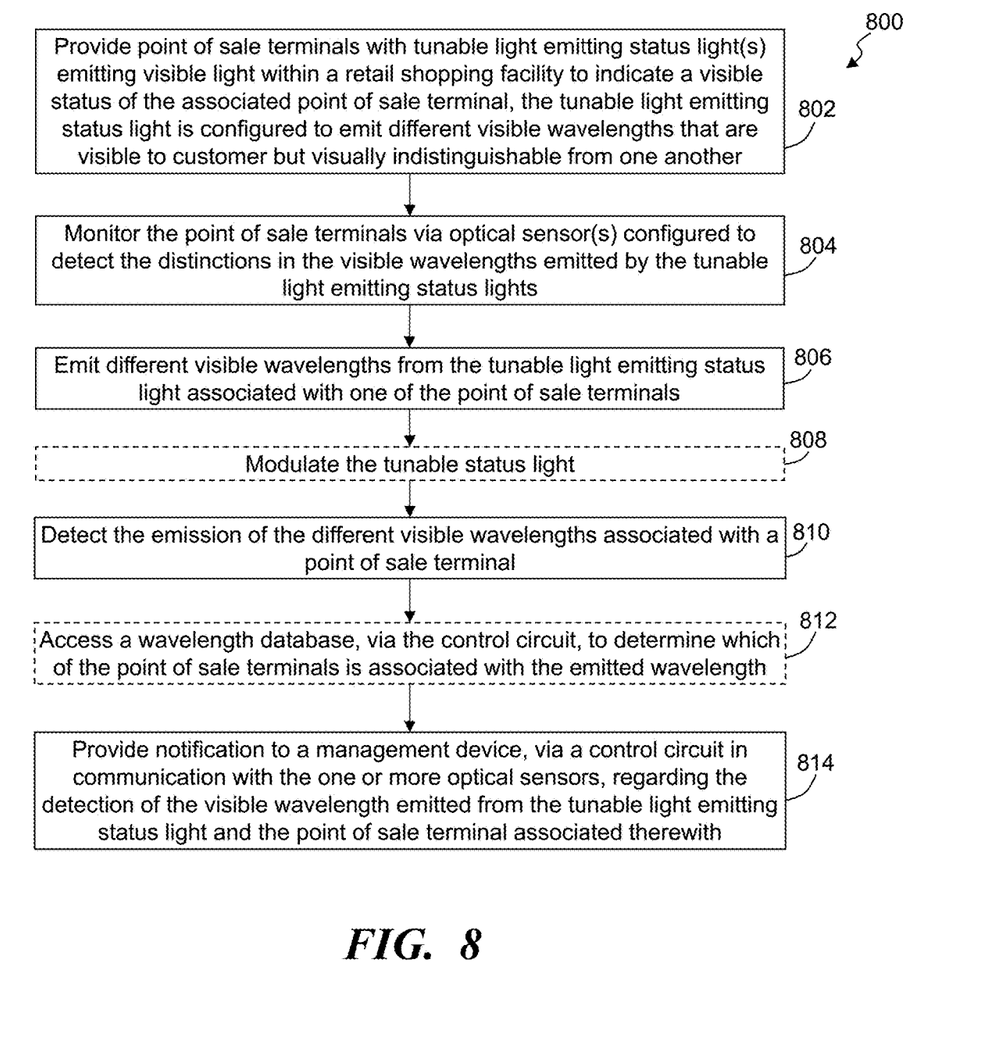
FIG. 8 is a flow diagram of a method for monitoring point of sale terminals in accordance with some embodiments.

FIG. 8 illustrates a method 800 of monitoring point of sale terminals according to the teachings herein. In one illustrative approach, the method 800 includes providing 802 a tunable light emitting status light(s) emitting visible light that is visible to customers within a retail shopping facility. This light visually indicates a status of the associated point of sale terminal to the customers, such as by providing a green light for an open terminal. Furthermore, the tunable light emitting status light is configured to emit different visible wavelengths that are visible to customers but visually indistinguishable from one another. For example, the green light may emit a regular wavelength of 570 nm, but the visible light emitting status light may emit a wavelength of 571 nm to indicate that the point of sale terminal will require receipt paper shortly.

In step 804, the method 800 includes monitoring point of sale terminals in the retail shopping facility via one or more optical sensors that are configured to detect the distinctions in the visible wavelengths and intensities emitted by the tunable light emitting status light. As mentioned above, the distinctions in the emitted are visually indistinguishable to the customers, but the optical sensors are configured to recognize the particular wavelengths and/or intensities emitted, and therefore can detect a change in the wavelengths or intensities that go visually undetected by a customers. Further, the method 800 also may include emitting 806 different visible wavelengths from the tunable light emitting status light associated with the point of sale terminals.

In one illustrative approach, the method 800 includes accessing 812 a light or wavelength database to determine which of the point of sale terminals is associated with the various emitted visible wavelengths, intensities, and/or changes therein. By one approach, the light database includes at least one of: a specific wavelength or a combination of wavelengths corresponding to different point of sale terminals or notifications provided by a particular point of sale terminal. For example, the light database may indicate that particular wavelengths or intensities are associated with a particular point of sale terminal. Further, the light database may indicate what is being communicated by the emission of particular visible wavelengths and possibly changes thereto. By one approach, the visible light emitting status light is configured to modulate the emitted light to change insanity, phase, and wavelength over time. In another configuration, the tunable, visible light emitting status slight is configured to emit light having a plurality of wavelength peaks.

Based on the information in the light database and the emitted light, the method 800 also may provide 814 notification to a management or associate device regarding the detection of the visible light emitted from the visible light emitting status light, the changes in the visible light emitted, and the point of sale terminal associated therewith.

As used herein the non-visible light emitting status light may be configured to emit a specific wavelength, a plurality of different wavelengths, or a combination of wavelengths and an intensity associated with each wavelength. In some approaches, the visible light emitting status light(s) and/or the non-visible light emitting status light(s) are light emitting diodes. In yet other approaches, the status lights are tunable. By one approach, the non-visible light emitting status light may include a light emitting diode that may modulate 808 the light emitted.

Figure 6:
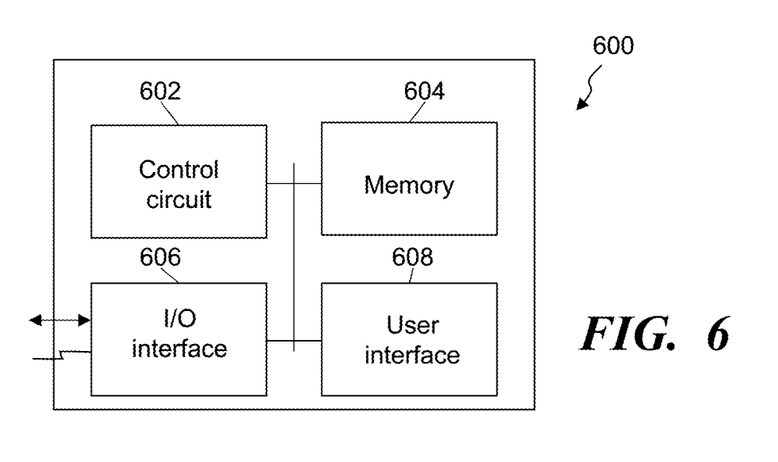
FIG. 6 illustrates an exemplary system for use in implementing systems, apparatuses, devices, methods, techniques, and the like in monitoring point of sale terminals in accordance with several embodiments.

The methods, techniques, systems, devices, services, servers, sources and the like described herein may be utilized, implemented and/or run on many different types of devices and/or systems. Referring to FIG. 6, there is illustrated a system 600 that may be used for any such implementations, in accordance with some embodiments. One or more components of the system 600 may be used to implement any system, apparatus or device mentioned above or below, or parts of such systems, apparatuses or devices, such as for example any of the above or below mentioned notification systems, point of sale terminals, optical sensors, associate devices, databases, devices, parts thereof, and the like. However, the use of the system 600 or any portion thereof is certainly not required.

By way of example, the system 600 may include one or more control circuits 602, memory 604, and input/output (I/O) interfaces and/or devices 606. Some embodiments further include one or more user interfaces 608. The control circuit 602 typically comprises one or more processors and/or microprocessors. The memory 604 stores the operational code or set of instructions that is executed by the control circuit 602 and/or processor to implement the functionality of the systems and devices described herein, parts thereof, and the like. In some embodiments, the memory 604 may also store some or all of particular data that may be needed to analyze images of store shelves and determine whether restocking is need or whether the store shelves closely resembled the planogram.

It is understood that the control circuit 602 and/or processor may be implemented as one or more processor devices as are well known in the art. Similarly, the memory 604 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 604 is shown as internal to the system 600; however, the memory 604 can be internal, external or a combination of internal and external memory. Additionally, the system typically includes a power supply (not shown), which may be rechargeable, and/or it may receive power from an external source. While FIG. 6 illustrates the various components being coupled together via a bus, it is understood that the various components may actually be coupled to the control circuit 602 and/or one or more other components directly.

Generally, the control circuit 602 and/or electronic components of the system 600 can comprise fixed-purpose hard-wired platforms or can comprise a partially or wholly programmable platform. These architectural options are well known and understood in the art and require no further description here. The system and/or control circuit 602 can be configured (for example, by using corresponding programming as will be well understood by those skilled in the art) to carry out one or more of the steps, actions, and/or functions described herein. In some implementations, the control circuit 602 and the memory 604 may be integrated together, such as in a microcontroller, application specification integrated circuit, field programmable gate array or other such device, or may be separate devices coupled together.

The I/O interface 606 allows wired and/or wireless communication coupling of the system 600 to external components and/or or systems. Typically, the I/O interface 606 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 608 may be used for user input and/or output display, such as the display of the point of sale terminal 102 or an associate device 112 that an associate at the retail shopping facility will manipulate during customer checkout. For example, the user interface 608 may include any known input devices, such one or more buttons, knobs, selectors, switches, keys, touch input surfaces, audio input, and/or displays, etc. Additionally, the user interface 608 include one or more output display devices, such as lights, visual indicators, display screens, etc. to convey information to a user, such as but not limited to communication information, status information, notifications, errors, conditions, and/or other such information. Similarly, the user interface 608 in some embodiments may include audio systems that can receive audio commands or requests verbally issued by a user, and/or output audio content, alerts and the like.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A notification system for monitoring point of sale terminals comprising:
point of sale terminals in a retail shopping facility;
one or more visible light emitting status lights associated with each of the point of sale terminals, the visible light emitting status lights are configured to emit different wavelengths visible to customers to indicate a visible status of the associated point of sale terminal to the customers;

at least one non-visible light emitting status light at each of the point of sale terminals, the non-visible light emitting status light is configured to emit a wavelength that is not generally visible to the customers within the retail shopping facility and indicates a management status to store management, wherein the non-visible light emitting status light is configured to emit a plurality of wavelengths including some different wavelengths that are visually indiscernible from one another;

one or more optical sensors configured to detect specific wavelengths from the non-visible light emitting status light and the one or more visible light emitting status lights and an intensity associated with the specific wavelength emitted from the at least one non-visible light emitting status light and the one or more visible light emitting status lights, wherein at least some of the different specific wavelengths are visually indiscernible from one another; and a control circuit in communication with the one or more optical sensors, the control circuit configured to provide a notification regarding the detection of the specific wavelength from the at least one non-visible light emitting status light and the point of sale terminal associated therewith.

2. The system of claim 1 wherein the at least one non-visible light emitting status light comprises multiple non-visible light emitting status lights emitting different wavelengths or a tunable non-visible light emitting status light and wherein the one or more visible light emitting status lights comprises multiple visible light emitting status lights or a tunable light emitting status light.

3. The system of claim 1 wherein the at least one non-visible light emitting status light is configured to emit a specific wavelength, a plurality of different wavelengths, or a combination of wavelengths and an intensity associated with each wavelength.

4. The system of claim 3 wherein the at least one non-visible light emitting status light is configured to modulate emitted non-visible light by changing one or more of an intensity, phase, and wavelength over time.

5. The system of claim 1 wherein the one or more optical sensors comprise at least one of:
a centralized invisible light sensor configured to scan the point of sale terminals and identify the non-visible wavelengths emitted from the non-visible light emitting status light and identify the terminal associated with the non-visible light emitting status light or:
multiple, decentralized non-visible light sensors configured to monitor at least one of the point of sale terminals and identify the non-visible wavelengths emitted from the non-visible light emitting status light and the point of sale terminal associated therewith.

6. The system of claim 1 wherein the one or more optical sensors includes at least one light receiver or light transceiver configured to detect invisible light emitted by the at least one non-visible light emitting status light.

7. The system of claim 1 further comprising at least one of:
an associate device in communication with the control circuit and configured to receive an indication of attention needed at one of the point of sale terminals; or
a handheld associate device configured to have one of the one or more optical sensors incorporated therein such that the non-visible light is detected and provides notification to an associate via a mobile application.

8. The system of claim 1 wherein the at least one non-visible light emitting status light and the one or more visible light emitting status lights are disposed in a low-profile fixture configured to avoid interfering with a line of sight between the at least one non-visible light emitting status light and the one or more optical sensors.

9. The system of claim 1 wherein the one or more visible light emitting status lights comprise at least four different light emitting status lights emitting different visible wavelengths including green, yellow, red, and white thereby providing visual notifications to customers when the different visible wavelengths are emitted.

10. The system of claim 1 wherein the one or more optical sensors comprises one or more infrared transceivers that is configured to receive an indication from a managing device.

11. The system of claim 1 further comprising a light database of non-visible wavelengths and notifications associated therewith and wherein the control circuit accesses the light database in providing the notification regarding the detection of the non-visible wavelengths from the at least one non-visible light emitting status light.

12. The system of claim 1 wherein the one or more visible light emitting status lights comprise visible light emitting diodes or a tunable visible light emitting diode and the at least one non-visible light emitting status light comprises a non-visible light emitting diode or a tunable non-visible light emitting diode.

13. A notification system for monitoring point of sale terminals comprising:
one or more visible light emitting status lights associated with point of sale terminals, the visible light emitting status lights are configured to emit different wavelengths visible to customers to indicate a visible status of the associated point of sale terminal to the customers;
at least one non-visible light emitting status light at each of the point of sale terminals, the non-visible light emitting status light is configured to emit a wavelength that is not generally visible to the customers within the retail shopping facility and indicates a management status to store management, the at least one non-visible light emitting status light including at least one of a non-visible light emitting diode or a tunable non-visible light emitting diode;
one or more optical sensors configured to detect the non-visible wavelength and an intensity associated with the non-visible wavelength emitted from the at least one non-visible light emitting status light;
a control circuit in communication with the one or more optical sensors, the control circuit configured to provide a notification regarding the detection of the non-visible wavelength from the at least one non-visible light emitting status light and the point of sale terminal associated therewith; and
a light database of non-visible wavelengths and notifications associated therewith and wherein the control circuit accesses the light database in providing the notification regarding the detection of the non-visible wavelengths from the at least one non-visible light emitting status light.

14. The system of claim 13 wherein the one or more visible light emitting status lights comprise visible light emitting diodes or a tunable visible light emitting diode.

15. The system of claim 13 wherein the one or more visible light emitting status lights comprise visible light emitting diodes or a tunable visible light emitting diode and the at least one non-visible light emitting status light comprises a non-visible light emitting diode or a tunable non-visible light emitting diode.

16. The system of claim 13 wherein the at least one non-visible light emitting status light is configured to emit a specific wavelength, a plurality of different wavelengths, or a combination of wavelengths and an intensity associated with each wavelength.

17. The system of claim 16 wherein the at least one non-visible light emitting status light is configured to modulate emitted non-visible light by changing one or more of an intensity, phase, and wavelength over time.

18. The system of claim 13 wherein the one or more optical sensors comprise at least one of:
   a centralized invisible light sensor configured to scan the point of sale terminals and identify the non-visible wavelengths emitted from the non-visible light emitting status light and identify the terminal associated with the non-visible light emitting status light: or
   multiple, decentralized non-visible light sensors configured to monitor at least one of the point of sale terminals and identify the non-visible wavelengths emitted from the non-visible light emitting status light and the point of sale terminal associated therewith.

19. The system of claim 13 wherein the one or more optical sensors includes at least one light receiver or light transceiver configured to detect invisible light emitted by the at least one non-visible light emitting status light.

20. The system of claim 13 further comprising at least one of:
   an associate device in communication with the control circuit and configured to receive an indication of attention needed at one of the point of sale terminals; or
   a handheld associate device configured to have one of the one or more optical sensors incorporated therein such that the non-visible light is detected and provides notification to an associate via a mobile application.

21. The system of claim 13 wherein the at least one non-visible light emitting status light and the one or more visible light emitting status lights are disposed in a low-profile fixture configured to avoid interfering with a line of sight between the at least one non-visible light emitting status light and the one or more optical sensors.

22. The system of claim 13 wherein the one or more visible light emitting status lights comprise at least four different light emitting status lights emitting different visible wavelengths including green, yellow, red, and white thereby providing visual notifications to customers when the different visible wavelengths are emitted.

23. The system of claim 13 wherein the one or more optical sensors comprises one or more infrared transceivers that is configured to receive an indication from a managing device.

24. A method of monitoring point of sale terminals comprising:
   providing point of sale terminals with one or more light emitting status lights emitting visible light that is visible to customers within a retail shopping facility to indicate a visible status of the associated point of sale terminal and at least one non-visible light emitting status light emitting non-visible light that is not visible to the customers within the retail shopping facility to indicate a management status to store management;
   monitoring the point of sale terminals via one or more optical sensors configured to detect specific wavelengths emitted by the at least one non-visible light emitting status light and the one or more light emitting status lights, wherein at least some of the different specific wavelengths are visually indiscernible from one another;
   emitting the non-visible light from the non-visible light emitting status light associated with one of the point of sale terminals;
   detecting the emission of the non-visible light associated with the one of the point of sale terminals; and
   providing notification to a management device, via a control circuit in communication with the one or more optical sensors, regarding the detection of the non-visible light emitted from the non-visible light emitting status light and the point of sale terminal associated therewith;
   wherein the at least one non-visible light emitting status light is configured to emit a plurality of different wavelengths including some that are visually indiscernible from one another or a combination of wavelengths including some that are visually indiscernible from one another and an intensity associated with each wavelength.

25. A method of monitoring a point of sale terminal comprising;
   providing point of sale terminals with one or more light emitting status lights emitting visible light that is visible to customers within a retail shopping facility to indicate a visible status of the associated point of sale terminal and at least one non-visible light emitting status light emitting non-visible light that is not visible to the customers within the retail shopping facility to indicate a management status to store management;
   monitoring the point of sale terminals via one or more optical sensors configured to detect the non-visible wavelengths emitted by the at least one non-visible light emitting status light;
   emitting the non-visible light from the non-visible light emitting status light associated with one of the point of sale terminals;
   detecting the emission of the non-visible light associated with the one of the point of sale terminals;
   providing notification to a management device, via a control circuit in communication with the one or more optical sensors, regarding the detection of the non-visible light emitted from the non-visible light emitting status light and the point of sale terminal associated therewith; and
   accessing a wavelength database, via the control circuit, to determine which of the point of sale terminals is associated with the emitted non-visible light and modulating the at least one non-visible light emitting status light.

* * * * *